United States Patent
Gryparis (10) Patent No.: US 7,536,394 B1
(45) Date of Patent: May 19, 2009

(54) OPERATIONAL INFORMATION MANAGEMENT SYSTEM

(75) Inventor: Mark Gryparis, Newtown, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 646 days.

(21) Appl. No.: 10/995,933

(22) Filed: Nov. 23, 2004

(51) Int. Cl.
*G06F 17/00* (2006.01)

(52) U.S. Cl. ............ 707/100; 707/101; 707/102; 707/103; 707/104.1

(58) Field of Classification Search ............ None
See application file for complete search history.

(56) References Cited

U.S. PATENT DOCUMENTS

| | | | |
|---|---|---|---|
| 7,080,088 B1* | 7/2006 | Lau | 707/101 |
| 7,117,215 B1* | 10/2006 | Kanchwalla et al. | 707/100 |
| 7,162,528 B1* | 1/2007 | Simonoff et al. | 709/229 |
| 7,191,183 B1* | 3/2007 | Goldstein | 707/101 |
| 2002/0073059 A1* | 6/2002 | Foster et al. | 707/1 |
| 2004/0007121 A1* | 1/2004 | Graves et al. | 89/1.11 |
| 2004/0049345 A1* | 3/2004 | McDonough et al. | 702/12 |
| 2006/0069497 A1* | 3/2006 | Wilson, Jr. | 701/120 |

\* cited by examiner

*Primary Examiner*—Khanh B Pham
*Assistant Examiner*—Andalib F Lodhi
(74) *Attorney, Agent, or Firm*—Duane Morris LLP (57) ABSTRACT

A computer-aided method is for knowledge or information management in a military Command and Control environment in which deployed assets, such as ships, tanks, troops, aircraft, satellites and the like are used for at least one of surveillance, reconnaissance, information gathering, and operational response. The information gathering is hierarchical, so data describing each perception about the environment is evaluated at its own level, and some of the data is nominated for promotion to a higher level. At each level, the data may be added to, and is processed and winnowed. The finished data at each level is sent to the next hierarchical level for further like processing. At the uppermost level, the winnowed data is stored in a database. All levels of the hierarchy have direct access to all the data in the database without going through the hierarchy.

6 Claims, 5 Drawing Sheets

4 TIER HYBRID

OPERATIONAL INFORMATION MANAGEMENT SYSTEM

FIELD OF THE INVENTION

This invention relates to information management in the context of military Command and Control.

BACKGROUND OF THE INVENTION

In the world of military and defense-related operations, assets may operate at many levels. Among these, tactical or front-line assets that go into harm's way directly interface with targets and threats. At the top level are the strategic decision makers, who do not go into harm's way, but require as much accurate and timely information as can be obtained in order plan a path to mission success. In between these are mid-level assets structured in the chain of command to most efficiently link the front-line assets with the strategic decision makers. Due to the different objectives and reaction times required, front-line and mid-level assets necessarily have customized levels of autonomy, and therefore must be able to make timely decisions at their level.

Front-line (tactical) assets (e.g., tanks, planes, ships, helicopters) must be able to cooperatively sense and engage targets and threats. Front-line assets must be able to cooperatively complete the Detect-Analyze-Respond cycle using terse, narrowly-defined tactical data sets in real-time time spans of milliseconds-to-seconds in order to achieve their missions and survive. Therefore, tactical information systems must be fast and accurate enough to put metal on target in time, which drives a terseness of volume and detail in the data handled.

Mid-level (operational) assets (ships, planes, command and intelligence centers) must be able to receive tactical and intelligence information from assets across multiple areas of responsibility, and to correlate information, see growing trends and make decisions across this bigger picture. Mid-level and front-line assets must cooperatively complete a Detect-Analyze-Respond cycle, using this larger and richer set of data, in near-real-time time spans of seconds-to-hours in order to achieve mid-level missions. Therefore, supporting information systems must be able to balance performance with the ability to handle a much larger and richer set of data than the tactical information systems.

Top-level (strategic) assets (command and intelligence centers) must be able to receive tactical and intelligence information from assets across all their areas of responsibility, and to correlate information, see long-term trends and make decisions that require the broadest level of information integration possible. Top-level, mid-level and front-line assets must cooperatively complete a Detect-Analyze-Respond cycle, with this huge data set, in non-real-time time spans of hours-to-days in order to achieve top-level or strategic missions. Therefore, supporting information systems must be able to handle huge volumes of data with rich and varied detail.

Although fast and effective tactical information systems have existed for many years, today's mid and top-level information management is not done reliably or consistently. In the existing military environment, information at this level is handled by a patchwork of tactical and intelligence systems that have each grown organically from the niche in which they were conceived. There is no native interoperability or common data model between these systems: they can only share information through customized interfaces that result in overall performance degradation and loss of detail in the total data set. Furthermore, there is no military information system today capable of handling the huge and richly detailed top-level data set in a way that supports today's best automated data analysis and management techniques. Instead, this work is often still done with paper and pencil, depending on the experience, intuition and ingenuity of the commanders and analysts to successfully navigate the sea of information without drowning.

Improved information management systems are desired to provide the information management (decision support) capability required at these higher levels.

SUMMARY OF THE INVENTION

A computerized method according to an aspect of the invention is for knowledge or information management in a military Command and Control environment, in which environment deployed assets are used for at least one of surveillance, reconnaissance, information gathering, and operational response. The method comprises the step, at a first stage of information gathering and distillation of Common Operational Picture (COP) candidate data, of (a) gathering both track and nontrack data, as available, and correlating andor fusing the track data if necessary to thereby produce first stage data. The method further comprises the step, at the first stage, of (b) nominating for promotion or distillation data from the first stage data which is deemed to be significant, to thereby produce first stage nominated information. The first stage nominated information is analyzed, correlated, fused andor annotated, as required in a further step (c), to thereby produce first stage processed data. In the next step (d) at the first stage, metadata fields are generated and populated for each portion of the first stage processed data, and the metadata fields are combined with the associated portion of the first stage processed data, to thereby produce first stage data elements. In this context, metadata fields include fields of information about the associated first stage processed data. Associations are created in a further first-stage step (e), between or among the first stage data elements, to thereby produce first stage associated data elements. A succeeding first stage step (f) includes making the first stage associated data elements available to a parent stage of information gathering and distillation. A second stage of information gathering and distillation of COP includes the step (g) of accepting first stage associated data elements from the first stage, and the step (h) of at least one of analyzing, correlating, fusing andor annotating the first stage associated data elements, and de-conflicting any conflicted first stage associated data elements while preserving data associations, to thereby produce second stage processed data. At the second stage, the next step (i) is to nominate for promotion to a higher stage that portion of the second stage processed data deemed to be significant for distillation, to thereby produce second stage distillable information. The second stage distillable information is (j) at least one of analyzed, correlated, fused andor annotated to thereby produce second stage processed data. Metadata fields are generated or populated (k) for each portion of the second stage processed data, to thereby produce second stage data elements. Associations are created (l) between andor among the second stage data elements, to thereby produce second stage associated data elements. The second stage associated data elements are (m) made available to one of (i) a higher-level parent stage of information gathering and distillation and (ii) a database; in the case in which the information is provided to a database, the database information is made directly available to users at the first and second stage of information gathering and distillation, without going through a hierarchy. A further method according to an aspect of the invention, where the step of making the second stage associated data elements available includes making available to a third stage of information gathering and distillation, in turn comprises the steps (n) of accepting from the second stage the second stage associated data elements, and (o) at least one of analyzing, correlating, fusing and annotating the second stage associated data elements, and de-conflicting conflicted second stage associated data elements, while preserving data associations, to thereby produce third stage processed data. This further method includes the step (p), from the third stage processed data, of nominating data deemed to be significant for distillation, to thereby produce third stage distillable information. The next step (q) includes at least one of analyzing, correlating, fusing and annotating the second stage distillable information, to thereby produce third stage processed data. At least one of generating and populating metadata fields for each portion of the third stage processed data is the next step (r), including associating the metadata with the third stage processed data, to thereby produce third stage data elements. Associations are created (s) between andor among the third stage data elements to thereby produce third stage associated data elements. The third stage associated data elements are made available (t) to one of (i) a higher-level parent stage of information gathering and distillation and (ii) a database.

In general, it is not expected that the information directly accessed from the database by the various stages or levels of information gathering and distillation will be the same, because each user can be expected to have different priorities, depending upon their location, capabilities, and the like.

In a particularly advantageous mode of the method, the first stage step of generating and populating metadata is followed by a step of applying andor modifying data access control to the first stage data elements.

In another particularly advantageous mode of the method, the first and second stages of information gathering and distillation of COP candidate data are performed on or in association with different first and second assets, respectively, and the COP data is made equally available to both the first and second assets.

DESCRIPTION OF THE INVENTION

Operational Information Management System (OMIS) is an improved information management system, which closes the loop between the ISR (operational assets), analysis (intelligence) and response (operational assets) in a way that provides a data-rich environment for analysis, correlation of seemingly disparate events and activities, and discovery of nonobvious relationships.

Figure 1:
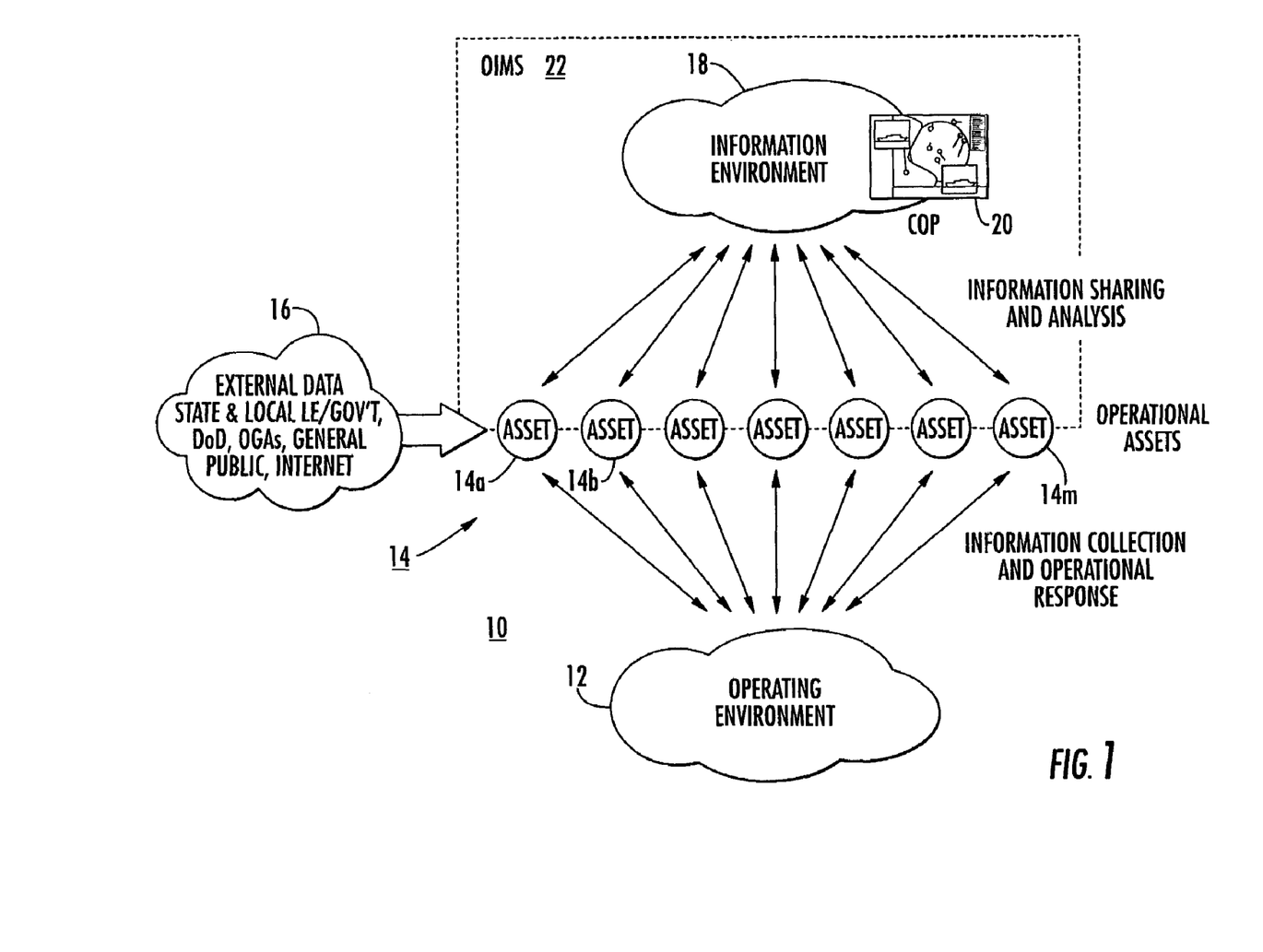
FIG. 1 is a conceptual illustration of the overall environment in which the invention is used, and showing assets within that environment.

FIG. 1 is a conceptual illustration of the overall environment in which the invention is used. In FIG. 1, an operating environment 12 is occupied by a plurality of assets illustrated as a set 14 of assets 14a, 14b, . . . , 14n. Assets of set 14 might, in a maritime environment, be ships, aircraft, surveillance craft such as spacecraft, and the like. Another possible environment might be a littoral environment, including, in addition to the maritime elements, ground assets such as troops and tanks.

Many of the assets of set 14 of assets of FIG. 1 will include sensors and information processing capability, and they may include human observers and human evaluators for some information. The sensors may include radar, video cameras, infrared cameras, and the like. Each asset may receive information from its own sensors and observers, and may also receive data from an external source, illustrated as a cloud 16. The information from source 16 may include state and local law enforcement (LE) or government information, information from the department of defense, (DoD), other government agencies (OGAs), or from the Internet.

In FIG. 1, the various assets of set 14 of assets also enjoys access to a common information environment, illustrated as an Information Environment cloud 18. As illustrated, the Information Environment 18 is associated with a Common Operational Picture (COP) 20. The Common Operational Picture 20 merely indicates that the assets of set 14 of assets have access to a common set of data which enables the various assets to view any desired portion of the operational picture. The invention is illustrated as OIMS 22, which is associated with the set 14 of assets and the information environment 18.

Figure 2:
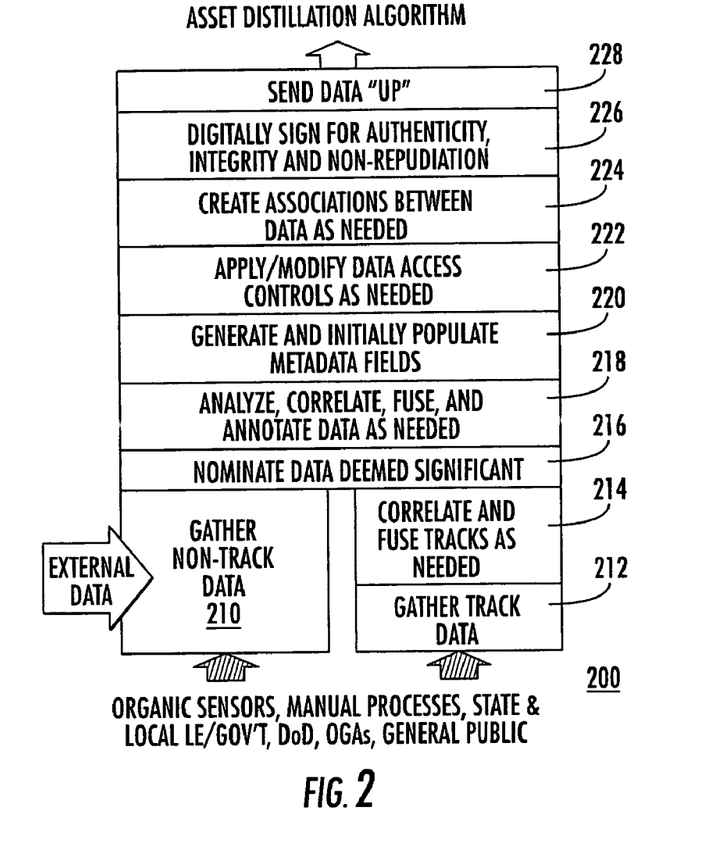
FIG. 2 is a simplified flow or logic diagram illustrating processing which may be performed at any one of the assets of FIG. 1.

FIG. 2 is a simplified flow or logic diagram 200 illustrating processing which may be performed at any one of the assets, such as 14a, of set 14 of assets of FIG. 1. In FIG. 2, the logic flows from bottom to top. The processing begins at the bottom of the FIGURE with the gathering of both track data and non-track data. In this context, "track" data is data which defines the position and direction of motion, vector or trajectory (path) of a target, and "non-track" data refers to data which is other than track data, including such data as the type of target, friend or foe, crew lists, cargo manifests, names of passengers andor crew, previous ports of call, Notice of Arrival (documents which must be filed by ships 96 hours before arrival at a port), and the like. Non-track information is gathered, as suggested by a block or step 210 of FIG. 2, and track data is gathered (block or step 212) and correlated andor fused as may be necessary, block or step 214. The data gathered in blocks or steps 210 and 212/214 is promoted to a block or step 216, which represents the evaluation of the data, and nomination of that data which is deemed to be significant. This step of determining significance may be performed with human assistance. The nomination of information or data as being significant is important, as it is only this nominated information or data which is ultimately promoted to the information environment 18 which is shared by all of the assets of asset set 14 of FIG. 1.

That information or data which is nominated as being important or significant in block (step) 216 of FIG. 2 is processed by a block 218. Block 218 represents the analysis, correlation, fusion, and annotation of data as may be required, to thereby produce processed information or data objects. From block 218, the flow of FIG. 2 continues to a block 220. Block 220 represents generation of one or more metadata objects, and association of each metadata object with a portion of the processed data or data objects, to thereby generate data elements. Each data element includes at least one data object and one metadata object.

In FIG. 2, the data elements produced by block 220 are processed by a block 222, which represents application of data access control information, or modification of already-extant data access control information. Such information limits or controls access to the data or metadata, or both, to those assets or users having appropriate security levels. The security-controlled data elements are coupled to a block 224, which represents creation of associations between and/or among data elements as may be appropriate. The associations may be viewed as being pointers which indicate a relationship between the data elements. Examples of associations include links between ship tracks and Notice of Arrival paperwork, Notice of Arrival paperwork and crew manifests, crew manifests and criminal records, crew manifests and intelligence reports.

In FIG. 2, the data elements, together with their associations, if any, are processed in block 226, by digitally signing the data element with a signature identifying the source, thereby attesting to the authenticity and integrity of the data element, and preventing repudiation of the data elements.

Following the last step, represented by block 228, of the flow of FIG. 2, the data elements are sent "up" to the next level, which may in one embodiment correspond to the information environment 18 of FIG. 1. As mentioned, the data of information environment 18 becomes available to all the assets of set 14 of assets of FIG. 1, subject to data access control. The data environment 18 may be viewed as being a database in which the data elements, including their metadata elements and associations, are stored.

Figure 3A:
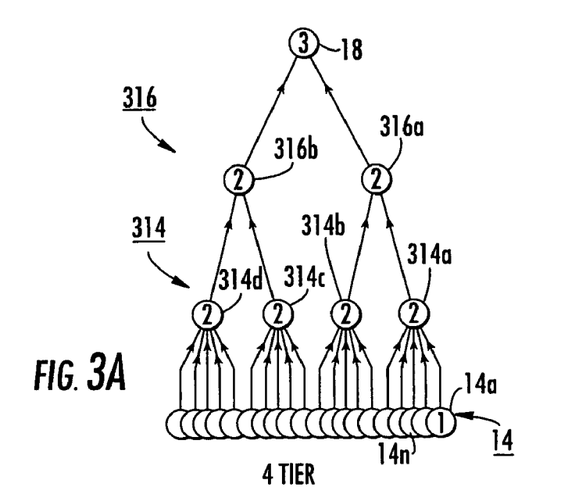
FIG. 3a is a simplified diagram illustrating a system generally similar to that of FIG. 1, but including additional stages or levels of assets or processing forming a hierarchy.

FIG. 3a is a simplified diagram illustrating a system generally similar to system 10 of FIG. 1, but including additional stages of assets or processing levels between the lowermost or first stage or level and the uppermost stage, which is the information environment. In general, the arrangement of FIG. 3a defines a hierarchy including several stages of processing. More particularly, the arrangement of FIG. 3a illustrates set 14 of assets at its lowest stage or level, an additional stage including a set 314 of assets similar to those of set 14, in that they may also include their own sensors and external data inputs. In addition, each asset of set 314 of FIG. 3a includes its own data processing, or it may not include sensors, but instead may include only data input and processing. Data produced by assets of set 14 of assets, as for example asset 14a, is passed to an asset at the next higher level, namely asset 314a of asset set 314. Data originating from a second stage asset, such as asset 314a of set 314 of assets, is processed to form data elements, and the data elements so formed are combined with further-processed data elements originating from the next lower tier of assets, to form second stage data elements.

It should be noted that the assets or nodes of stage 314 of assets of FIG. 3a are designated with the numeral "2" to thereby identify them as nodes which have both "parent" and "child" nodes. A designation of "3" identifies an asset or node which has only "child" nodes, and no parent node. The assets or nodes of set 14 of FIG. 3a, by contrast, have "parent" nodes but no "child" nodes, and are designated "1".

The second-stage data elements produced by second stage 314 assets of FIG. 3a are provided or "sent up" to assets at a next higher stage of processing, illustrated in FIG. 3a as a set 316 of assets. Set 316 of assets includes assets 316a and 316b. The assets of set 316 are similar or identical to those of set 314, and they receive data elements from their "child" (next lower level) assets, and produce data elements which are provided to their "parent" (next higher level) assets. The data elements produced by asset set 316 are provided to the information environment 18 at the top of the hierarchy. The information environment 18 may be viewed as being a database, which in one embodiment of the invention is directly accessible by any and/or all of the assets, regardless of the level of processing with which they may be associated.

Figure 3B:
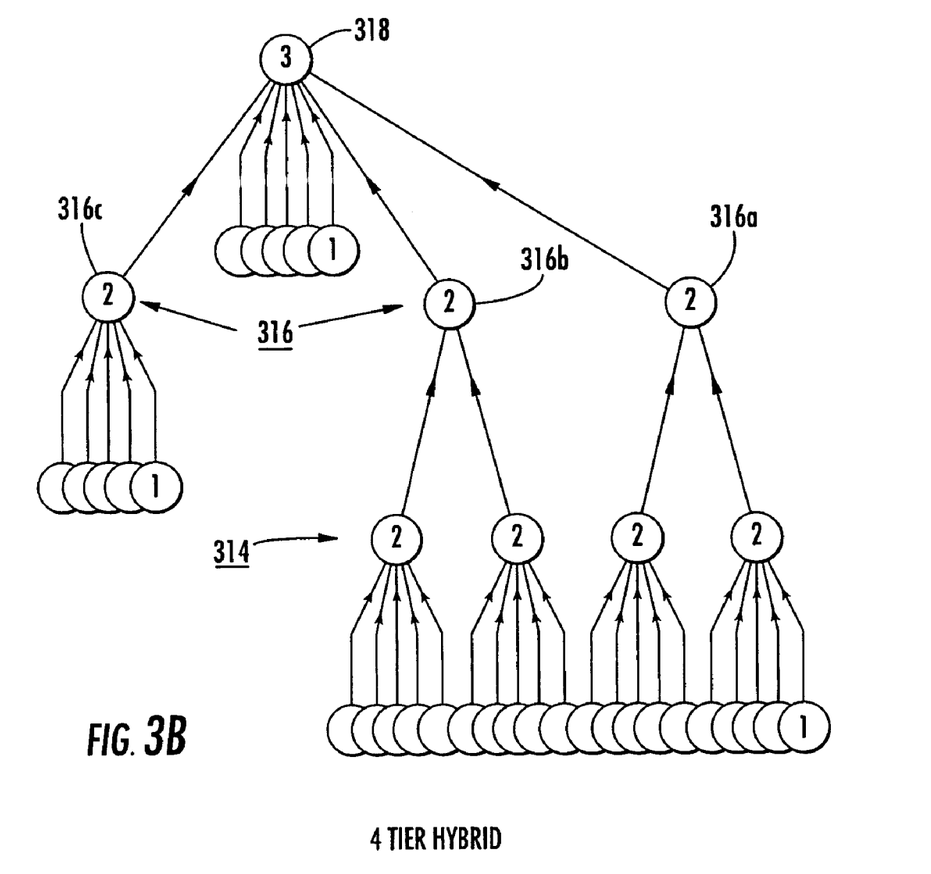
FIG. 3b illustrates another possible hierarchical arrangement which may be used in a system according to an aspect of the invention.

FIG. 3b illustrates another possible hierarchical arrangement which may be used in a system according to an aspect of the invention. In FIG. 3b, the set 314 of assets is the same as that of FIG. 3a. The set 316 of assets, however, includes an additional asset 316c, which corresponds to a "2" node, having both parent and child nodes. The highest level or stage asset is designated 318, which is a "3" node, which may be viewed as the information environment.

Figure 4:
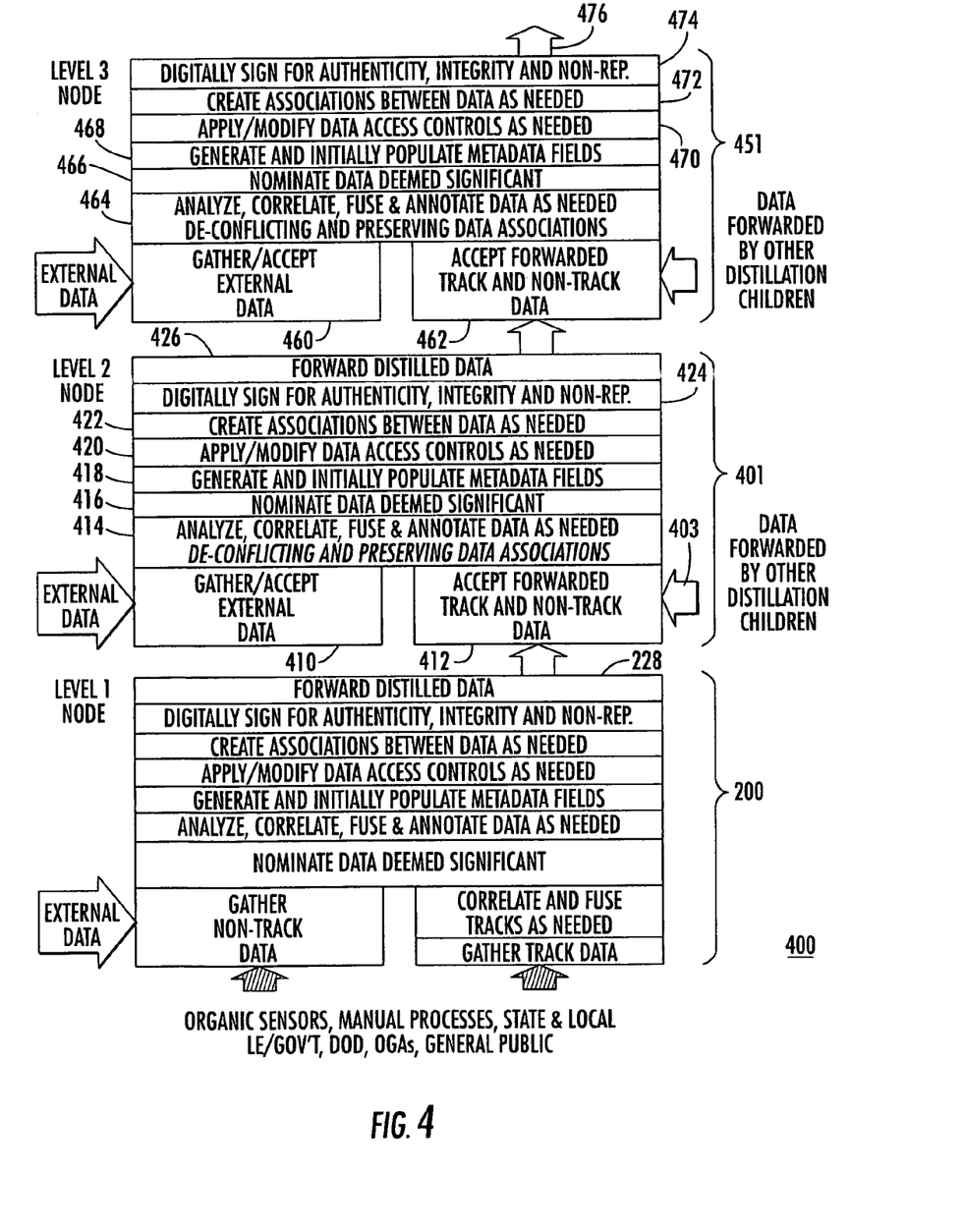
FIG. 4 is a simplified flow chart or diagram of the logic or processing flow associated with the processing of data through the various stages of either of the arrangements of FIG. 3a or 3b.

FIG. 4 is a simplified flow chart or diagram of the logic or processing flow associated with the processing of data through the various stages of either of the arrangements of FIG. 3a or 3b. In FIG. 4, the lowest level of processing is designated 200, thereby indicating its correspondence with the processing of FIG. 2. The data elements produced by first-level processing 200 is "sent up" for processing to the second-level processing 401 of FIG. 4, as suggested by block 228 of FIG. 4. In second stage processing 401, external data is gathered or accepted, as suggested by block 410. That is to say, the asset associated with level 401 of processing may include its own sensors and other direct sources of data, which produce what may be termed "second stage data." Also in processing block 401, the forwarded track and non-track data from processing 200 is accepted in a block 412, together with corresponding track and non-track data or data elements from other child nodes, as suggested by arrow 403. Thus, second stage or level processing 401 of FIG. 4 may process newly developed "second stage data" originating at that second stage, as well as forwarded data elements which originate at (possibly plural) lower levels of action and which have already been processed at a lower level or stage of processing, such as stage 200 of FIG. 4.

A great deal of the processing performed in second stage 401 of FIG. 4 is similar to that performed at the first stage 200 of processing. However, the processing at the second and higher levels of processing differs from that of the lowermost or first level of processing in that the higher-level processing includes a step 414 of de-conflicting any conflicting data, while preserving data associations, which de-conflicting-while-preserving step is absent from the processing at the lowest stage. This may be understood by considering that the first stage of processing 200 may be independently performed by several different assets, and these assets view or perceive the physical environment from different vantage points and by the use of independent data gathering devices or sensors. As a result of unavoidable errors, the same information relating to the physical environment may be differently perceived at each different asset, so that the information relating to a single item or event of the physical environment may, when reported to a higher level of processing, not fully correlate. As a simple example, radar tracks of a target as viewed from different ships may be reported to be in different locations, even though the same target is being reported. As another example, a piece of data may be nominated as being significant by one lower level of processing, and not be so nominated by another lower level of processing; this will result in the reporting to the second level processing 401 of data which is totally absent from another report, even though the reports relate to the same matter. The data sent up from lower levels of processing may also include data associations which should not be lost. For example, a level "2" node may need to fuse two track data elements from different level "1" nodes, to create a new, fused track data element. But an association between one of the original track data elements and an intelligence report data element must survive the track fusion process, so that an association will exist between the new fused track data element and the intelligence report data element. Therefore, the second level of processing evaluates the data elements received from lower levels of processing and second-level data from its own data inputs, and attempts to de-conflict any conflicting information.

Processing block (step) 414 of FIG. 4 also performs any or all of analysis, correlation, fusing and annotation of the second stage data and the first stage data elements which are sent up to the second stage 401 of processing, as may be appropriate, to thereby produce second stage processed data. Non-conflicting tracks can be fused without de-conflicting. The second stage processed data produced by block 414 of FIG. 4 is evaluated in a nomination block or step 416. This step may be automated, performed by humans, or a combination of both. A block or step 418 of FIG. 4 represents the generation of metadata fields relating to the various portions of the nominated data or information, and/or population of such metadata fields. The metadata fields are also associated with their corresponding nominated data to thereby produce data elements including data portions and metadata portions. A block 420 applies or modifies data access controls as may be appropriate, to make the data available to only those parties who are authorized.

The data elements, whether access controlled or not, are evaluated for associations in a block or step 422 of FIG. 4, and the associations are appended to the data elements. A block 424 represents the digital signing of the data elements with their appended associations, for authenticity verification and non-repudiation. A block or step 426 represents the forwarding or sending up of the digitally signed second stage data elements, including their associations, if any (the "distilled data"), to either a next higher stage or level of processing, or to the data environment 18.

In the arrangement of FIG. 4, the distilled data or second stage data elements are sent up to a yet further or third stage of processing, which is designated 451. The processing of this further stage 451 is nominally identical to that of any stage or level having both parent and child nodes, so that the third processing 451 is the same as that of second stage 401. More particularly, third stage processing includes local data gathering in a step 460 corresponding to second stage step 410, and also includes accepting in a block or step 462 of forwarded track and non-track data elements from the second stage 401 of processing, corresponding to second stage block 412. The data elements are de-conflicted while preserving data associations, and at least one of analysis, correlation, fusing, and annotation of the data and data elements are performed in a third stage block 464, corresponding to second stage block 414, to thereby produce third-stage processed data. Third-stage nomination is performed in a block 466, corresponding to second-stage block 416, to thereby produce third-stage nominated data. Generation and/or population of metadata fields, and their association with the corresponding third-stage nominated data are performed in a block 468, to thereby produce third stage data or information elements. Block 468 finds correspondence at second-stage block 418. Data control of the third-stage data elements is applied or modified at a third-stage block 470, corresponding to second-stage block 420. Associations between or among the third-stage data elements are generated and appended in a third-stage block 472, corresponding to second-stage block 422. Digital signature is applied in a block 474, and arrow 476 represents the sending up of the data to the next higher level of processing or to the data environment 18.

The information stored in data environment 18 of FIG. 1 may in practice be quite extensive when several levels of assets evaluate their surroundings and nominate data for promotion to the next higher level. The data may be so extensive that it provides detailed information about events and conditions over many thousands of square miles. Such a large amount of information may be more than can be conveniently displayed in real time, both for lack of sufficiently "large" visual displays, and because of the limited ability of human users to absorb such large quantities of data. Consequently, the totality of the data in the data environment 18 of FIG. 1 may not actually be displayed or made available anywhere.

According to an aspect of the invention, authorized users at all levels of the processing may access the entirety of the data in data environment 18 of FIG. 1, so as to have access to a Common Operational Picture (COP). However, it is expected that each user will actually use and/or display only that portion of the data found in data environment 18 which is relevant to his or its own situation. While detailed information may be available about event occurring thousands of miles away, the operators of an asset may be more concerned with matters occurring or projected to have an influence on their mission or surroundings.

Figure 5:
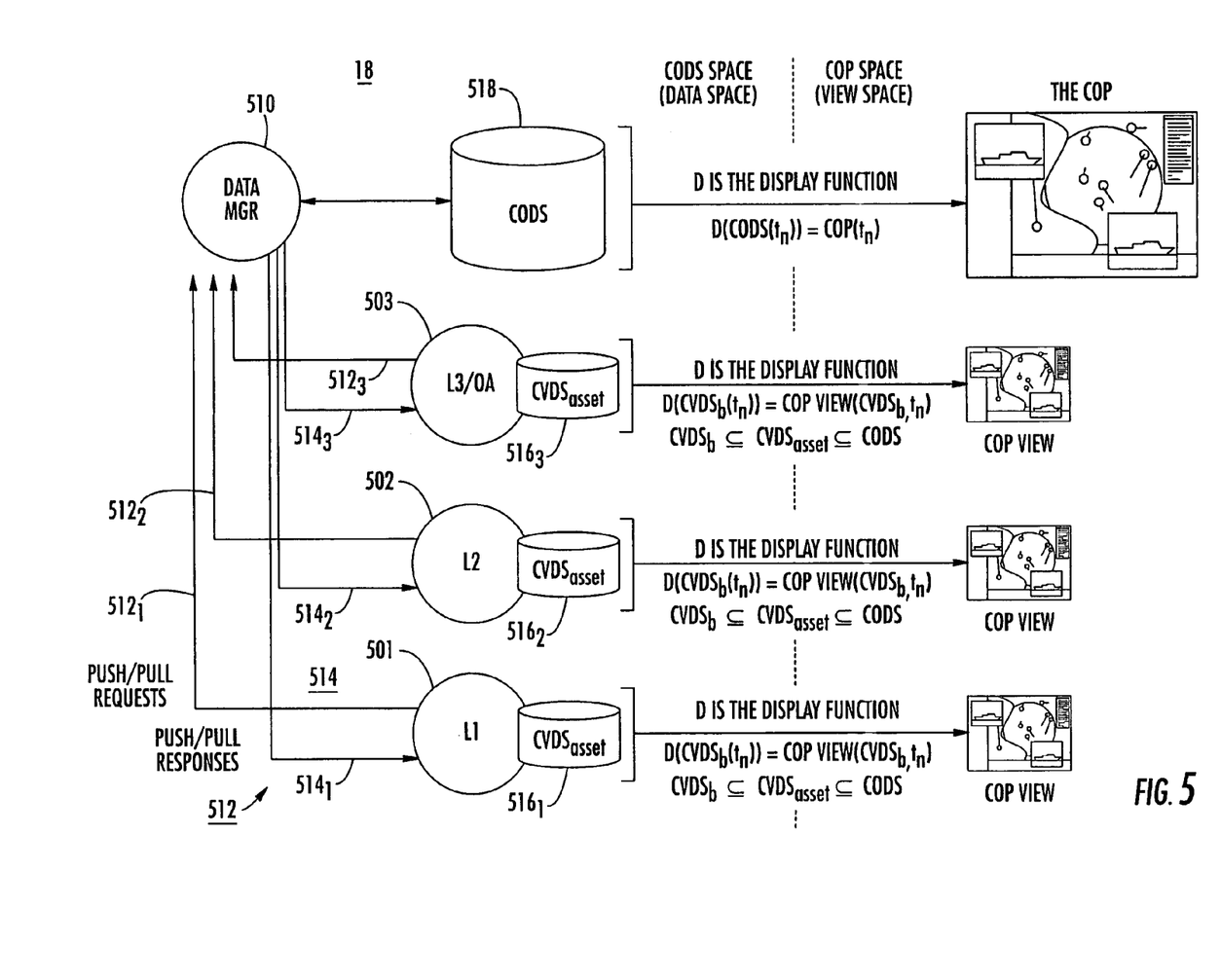
FIG. 5 conceptually illustrates how the various levels of processing or assets retrieve their own relevant view of the Common Operational Picture.

FIG. 5 is a conceptual diagram illustrating the operational pictures which may be expected to be used at various levels of the architecture of FIG. 3a or 3b. In FIG. 5, the data environment 18 is represented as including a data manager 510 and a Common Operational Data Set (CODS) in database 518. A first level L1 of processing or assets is designated 501, a second level L2 of processing or assets is designated 502, and a third, and highest, level or Operational Apex (OA) L3 of processing or assets is designated 503. The arrows designated generally as 512 represent the sending of push or pull requests from the various levels of processing or assets to the data manager 510, requesting portions of the data stored in database 518. A pull request is defined as a request to send the specified data to the requester, while a push request is defined as a request to send the specified data to an asset other than the requester. More particularly, the arrow designated 512, represents requests for data from lowest L1 level 501, the arrow designated 512₂ represents requests for data from second L2 level 502, and the arrow designated 512₃ represents requests for data from third L3 level 503. The data returned from the database 518 by the data manager 510 to the first, second, and third levels 501, 502, and 503 in response to the requests from those levels is represented in FIG. 5 by arrows $514_1$, $514_2$, and $514_3$, respectively, of a set 514. This data is stored in a local database (CVDS) at each level. The databases for the first, second and third levels are designated $516_1$, $516_2$, and $516_3$, respectively. As mentioned, the information requested by each asset is likely to be that related to its mission and/or environment, and not the totality of information available at the data environment 18. Thus, each level of asset or processing can display information relating to its own situation, without requiring accessing that information by way of a hierarchical command structure, even though the information stored in the information environment has gone through at least one stage of distillation.

In the context of FIG. 5, data display is defined as a function mapping the data elements in an asset's local database (CVDS) to visual representations on a local computer monitor. These data elements and the associations between them can then be selectively viewed in a variety of visual formats by manipulating their visual representations through a Graphical User Interface (GUI). An aspect of the present invention is that only data, in the form of data elements, and not views of the data, nor even a view (a COP in the traditional sense) are distilled by and communicated between assets. All views are generated locally by each asset, using locally-available data.

It should particularly be noted that each asset, regardless of its location in the hierarchy, can combine all of its locally available information with the operational picture which it chooses to display, notwithstanding that it may not have been deemed sufficiently significant to promote to the higher level. Thus, the local commander has immediately available to him the full panoply of data representing the Common Operational Picture without delay by passage through a hierarchy, while still being able to see all of the local data, possibly deemed to be of limited importance, in real time. Thus, when local information originally deemed to not be of importance crosses a threshold of significance, the local commander's operational view immediately displays that information. That same information must still wend its way into the Common Operational Data Set (CODS) by passage through the upward hierarchy, but the local commander can display that newly important information in his own COP View notwithstanding that it may not yet have reached the CODS.

Other embodiments of the invention will be obvious to those skilled in the art. For example, a given asset may carry or include more than one level of processing. For example, the flagship of a fleet might include its own sensors for directly monitoring its environment, and tactical levels of processing associated with those sensors and the flagship's firepower, but might also include Command and Control functions which receive data or information nominated by other assets, including ships, airplanes, and satellites, for generation of a high-level Common Operational Picture. Thus, such a flagship might include or carry more than one level of processing appropriate to the many functions which it performs.

Methods according to the invention will ordinarily be performed with the aid of, or almost entirely by, computer systems. Some of the determinations of relative importance of data for promotion are expected to be human-aided, at least during those times in which threats are perceived.

A computer-aided method according to an aspect of the invention is for knowledge or information management in a military Command and Control environment, in which environment deployed assets (14*a*, . . . ) are used for at least one of surveillance, reconnaissance, information gathering (210, 410, 460), and operational response (that is, firing at a target, for example). The method comprises the step, at a first stage (L1) of information gathering (210) and "distillation" of Common Operational Picture (COP) candidate data, of (a) gathering (210, 212) both track and nontrack data, as available, and correlating andor fusing (214) the track data if necessary to thereby produce first stage data. The method further comprises the step, at the first stage (L1), of (b) nominating (216) for promotion or distillation data from the first stage data which is deemed to be significant, to thereby produce first stage nominated or distillable information. The first stage nominated or distillable information is analyzed, correlated, fused andor annotated (218), as required, in a further step (c), to thereby produce first stage processed data. In the next step (d) at the first stage (L1), metadata fields are generated and initially populated (220) for each portion of the first stage processed data, and the metadata fields are combined with the associated portion of the first stage processed data, to thereby produce first stage data elements. In this context, metadata fields include fields of information about the associated first stage (L1) processed data. Associations (224) are created in a further first-stage step (e), between or among the first stage data elements, to thereby produce first stage associated data elements. A succeeding (228) first stage step (f) includes making the first stage (L1) associated data elements available to a parent stage of information gathering (401) and distillation. A second stage (L2) of information gathering (401) and distillation of COP includes the step (g) of accepting (412) first stage (L1) associated data elements from the first stage (L1) and of gathering/accepting (410) external data, and the step (h) of at least one of analyzing, correlating, fusing andor annotating (414) the first stage (L1) associated data elements, and de-conflicting any conflicted first stage (L1) associated data elements while preserving data associations, to thereby produce second stage processed data. At the second stage (L2), the next step (i) is to nominate for promotion (416) to a higher stage that portion of the second stage processed data deemed to be significant for distillation, to thereby produce second stage nominated or distillable information. Metadata fields are generated (418) or populated (k) for each portion of the second stage nominated or distillable data, and associated with the corresponding data, to thereby produce second stage data elements. Associations are created (422) between andor among the second stage data elements, to thereby produce second stage associated data elements. The second stage associated data elements are (m) made available (426) to one of (i) a higher-level (L3) parent stage (451) of information gathering (210, 410, 460) and distillation and (ii) a database (18); in the case in which the information is provided to a database (18), the database information may be made directly available to users (14*a*, 14*b*, . . . ) at the first (L1) and second (L2) stage of information gathering (210, 410, 460) and distillation, without going through a hierarchy.

A further method according to an aspect of the invention, where the step (426) of making the second stage associated data elements available includes making available to a third (L3) stage (451) of information gathering and distillation, in turn comprises the steps (n) of accepting (462) from the second (L2) stage the second stage associated data elements, and (o) at least one of analyzing, correlating, fusing and annotating the second stage associated data elements, and de-conflicting conflicted second stage associated data elements while preserving data associations, (464) to thereby produce third stage (L3) processed data. This further method includes the step (p), from the third stage processed data, of nominating data (466) deemed to be significant for distillation, to thereby produce third stage nominated or distillable information. At least one of generating and populating metadata fields (468) for each portion of the third stage nominated or distillable information is the next step (r), including associating the metadata with the third stage nominated or distillable information, to thereby produce third stage data elements. Associations are created (s) between andor among the third stage data elements to thereby produce (472) third stage associated data elements. The third stage associated data elements are made available (476, t) to one of (i) a higher-level parent stage of information gathering (210, 410, 460) and distillation and (ii) a database.

In general, it is not expected that the information directly accessed from the database by the various stages or levels of information gathering and distillation will be the same, because each user can be expected to have different priorities, depending upon their location, capabilities, and the like.

In a particularly advantageous mode of the method, the first stage (L1) step of generating and populating metadata (220) is followed by a step of applying andor modifying data access control (222) to the first stage (L1) data elements.

In another particularly advantageous mode of the method, the first (200) and second (401) stages of information gathering and distillation of COP candidate data are performed on or in association with different first and second asset (14a, 14b, ...)s, respectively, and the COP data is made equally available to both the first and second assets (14a, 14b, ...).

In a further aspect of the method, each asset may access a different subset of the data in the COP.

What is claimed is:

1. A computerized method for knowledge or information management in a military Command and Control environment, said method comprising:

at a first stage of information gathering and distillation in said military Command and Control environment in which front-line assets, mid-level assets and top-level assets are deployed and are used for at least one of surveillance, reconnaissance, information gathering and operational response with respect to a military target, gathering both track and nontrack data of said military target, as available, from the front-line assets and at least one of correlating and fusing said track data if necessary thereby producing first stage data, wherein the front-line assets comprise at least one of tanks, planes, ships and helicopters;

from said first stage data, nominating data deemed to be significant for distillation, thereby producing first stage nominated information;

at least one of analyzing, correlating, fusing and annotating said first stage nominated information thereby producing first stage processed data;

at least one of generating and populating metadata fields, wherein said metadata is the set of indexical, searchable characteristics of data, for each portion of said first stage processed data, and associating said metadata with said first stage processed data, thereby producing first stage data elements;

creating associations among said first stage data elements thereby producing first stage associated data elements;

making said first stage associated data elements available to the mid-level assets, wherein the mid-level assets comprise at least one of ships, planes, and command and intelligence centers;

at a second stage of information gathering and distillation in a military Command and Control environment, accepting said first stage associated data elements;

at least one of analyzing, correlating, fusing and annotating said first stage associated data elements, and de-conflicting conflicted first stage associated data elements, while preserving data associations, thereby producing second stage processed data;

from said second stage processed data, nominating data deemed to be significant for distillation, thereby producing second stage nominated information;

at least one of generating and populating metadata fields for each portion of said second stage processed data, and associating said metadata with said second stage nominated data, thereby producing second stage data elements;

creating associations among said second stage data elements thereby producing second stage associated data elements; and making said second stage associated data elements available to one of (a) a database and (b) a higher-level stage of information gathering and distillation.

2. A method according to claim 1, wherein said step of making said second stage associated data elements available includes making available to a third stage of information gathering and distillation, which in turn comprises the steps of:

accepting from said second stage said second stage associated data elements;

at least one of analyzing, correlating, fusing and annotating said second stage associated data elements, and de-conflicting conflicted second stage associated data elements, while preserving data associations, to thereby produce third stage processed data;

from said third stage processed data, nominating data deemed to be significant for distillation, to thereby produce third stage nominated information;

at least one of analyzing, correlating, fusing and annotating said third stage nominated information, to thereby produce third stage processed data;

at least one of generating and populating metadata fields for each portion of said third stage processed data, and associating said metadata with said third stage processed data, to thereby produce third stage data elements;

creating associations among said third stage data elements to thereby produce third stage associated data elements; and making said third stage associated data elements available to the top-level assets and (b) a database, wherein the top-level assets comprise at least one command and intelligence centers.

3. A method according to claim 1, wherein said first stage step of generating and populating metadata is followed by a step of applying and/or modifying data access control to said first stage data elements.

4. A method according to claim 1, wherein:

said first and second stages of information gathering and distillation of COP candidate data are performed on different first and second assets, respectively; and said COP data is made equally available to both said first and second assets.

5. A method according to claim 1, further comprising the step of making direct access to data stored in said database available to both said first and second stages of information gathering and distillation.

6. A method according to claim 5, wherein each of said first and second stages of information gathering and distillation access and display different subsets of said data stored in said database.

* * * * *